(No Model.)

L. H. ROGERS.
TREE TRANSPLANTER.

No. 491,135. Patented Feb. 7, 1893.

Witnesses:
Otto E. Hoddick.
Paul Voorhees.

Inventor
Lewis H. Rogers
By Paul James Gregory
Attorney.

UNITED STATES PATENT OFFICE.

LEWIS H. ROGERS, OF BUFFALO, NEW YORK.

TREE-TRANSPLANTER.

SPECIFICATION forming part of Letters Patent No. 491,135, dated February 7, 1893.

Application filed June 22, 1892. Serial No. 437,664. (No model.)

*To all whom it may concern:*

Be it known that I, LEWIS H. ROGERS, a citizen of the United States, residing at Buffalo, in the county of Erie and State of New York, have invented certain new and useful Improvements in Tree-Transplanters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to that class of apparatus designed for use in transplanting trees of large and cumbersome size, and has for its object the ease of loading, transporting, and unloading the same.

To that end, my invention consists of a light and strong frame, which can be secured to the tree to be removed when in its upright position, and after the earth and roots have been sufficiently loosened, the tree and its attached frame can be tilted over upon a wagon or sleigh backed up to the tree for that purpose, the frame being provided with means adapting it for ready engagement with the rear cross-piece or axle of the wagon or sleigh frame.

I will now minutely describe the manner in which I have carried out my invention, and then claim what I believe to be novel.

Figure 1:
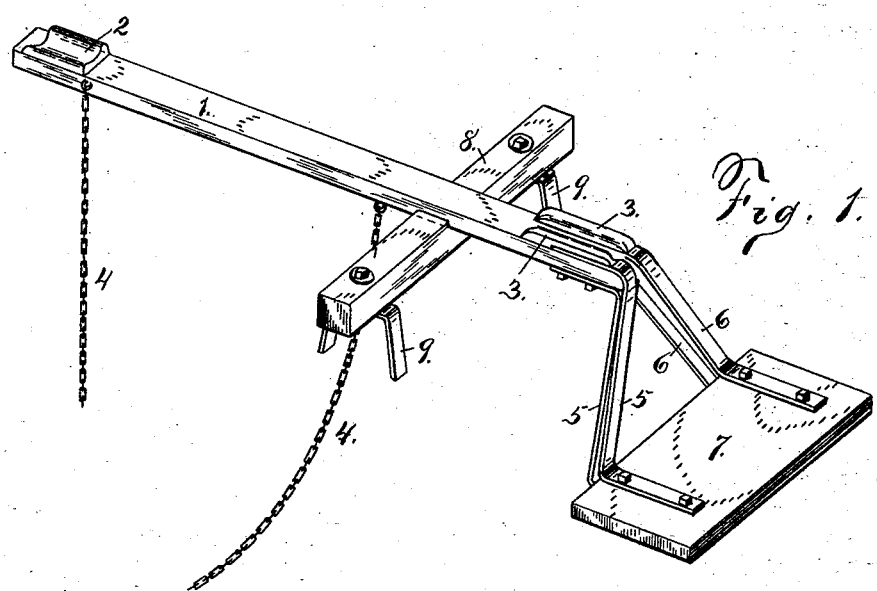
Figure 2:
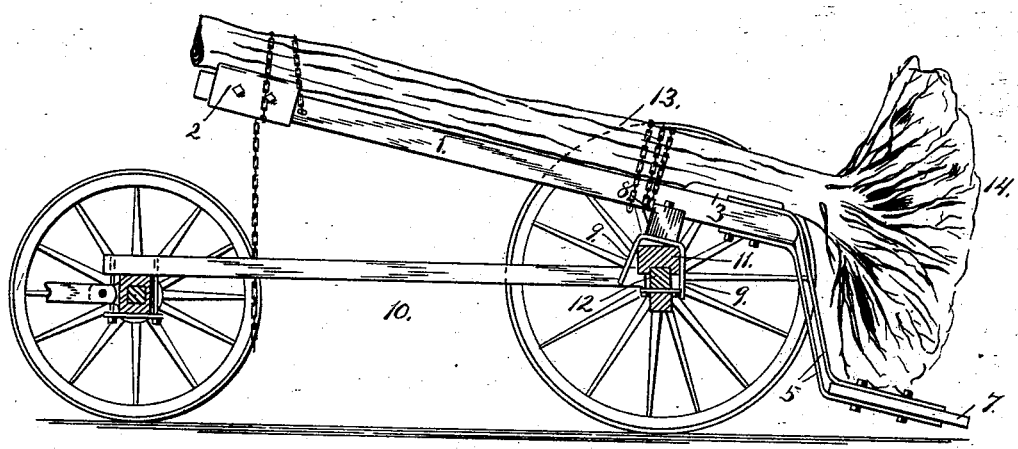

In the drawings—Figure 1, is a perspective view of my improved apparatus, and Fig. 2, is a side elevation of the apparatus with a tree attached ready for transportation.

Referring to the drawings—1, is a beam or plank of timber of sufficient length to accommodate the average tree trunk from the roots to the lower branches. At its upper or outer end is secured, the grooved or channeled block 2, and at its lower end, on each side, are similarly secured the tapering cleats 3, 3, between which, and upon the grooved block 2, the tree rests while being transported. Chains or ropes 4, attached to the beam 1, being used to securely hold the tree trunk in position. Metal arms 5, 5, and 6, 6, are bolted to the beam 1, at its rear end, and extend downwardly, in diverging directions at or near a right angle to the beam, their ends being turned outwardly parallel to the beam 1. A tail-board or rest 7, is securely bolted between the outwardly extending ends in a position parallel to the beam 1.

8, is a cross-piece of timber secured at its center to the underside of the beam 1, and nearer the tail-board than the outer end. At each end of the cross-piece 8, upon its under side, are securely bolted the metal yokes or catches 9, 9, extending downwardly and adapted for engagement with the rear cross-piece or axle of the wagon or sleigh frame.

In operation, the frame or apparatus just described is secured to the standing tree after the earth and roots have been sufficiently loosened, the tail-board extending into the excavation below the roots. The wagon 10, or sleigh having been backed up sufficiently near to the frame, it and the attached tree are then tilted over until the yokes 9, 9, of the cross-piece 8, engage with and rest upon the cross-piece 11, or in its absence, the axle 12, of the wagon or sleigh frame. The roots of the tree 13, and clinging earth, form a ball 14, which rests upon the tail-board 7, and prevents in a great measure undue shaking and consequent dislodgment of the earth clinging to the roots. After the tree has reached its destination, the wagon or sleigh is backed up to the excavation prepared for the reception of the roots of the tree, and the operation just described is reversed.

It will be seen that my improved apparatus can be easily and reliably used in connection with any form of wagon or sleigh frame, thus entirely doing away with any special construction of the carrying vehicle.

If desired, and as might be convenient in some cases, this apparatus could be used without the tail-board.

Having thus described my invention, what I claim and desire to secure by Letters Patent of the United States, is—

The apparatus for loading and unloading trees for transportation, consisting of the beam 1, with the grooved block 2 and beveled cleats 3, 3, for the reception of the tree trunk, the securing chains 4, 4, the tailboard 7 secured to the beam 1 by the metal strips 5, 5, and 6, 6, and the cross-piece 8 having the depending yokes 9, 9, adapted for engagement with the rear cross piece or axle of the carrying vehicle, all combined and operating substantially as herein shown and described.

In testimony whereof I affix my signature in presence of two witnesses.

LEWIS H. ROGERS.

Witnesses:
JOSEPH E. EWELL,
PAUL JAMES GREGORY.